United States Patent [19]

Savin

[11] Patent Number: 5,098,938

[45] Date of Patent: Mar. 24, 1992

[54] COATING COMPOSITION EXHIBITING IMPROVED RESISTANCE TO ENVIRONMENTAL ATTACK

[76] Inventor: Ronald R. Savin, 10448 Chester Rd., Cincinnati, Ohio 45215

[21] Appl. No.: 697,731

[22] Filed: May 3, 1991

Related U.S. Application Data

[63] Continuation of Ser. No. 319,382, Mar. 3, 1989, abandoned.

[51] Int. Cl.$^5$ .............................. C08K 7/08; C08K 7/10
[52] U.S. Cl. ................................. 523/220; 523/442; 523/443; 524/492; 524/493
[58] Field of Search .................. 523/220, 442, 443; 524/492, 493

[56] References Cited

U.S. PATENT DOCUMENTS

| | | | |
|---|---|---|---|
| 3,954,693 | 5/1976 | Fong | 523/458 |
| 3,998,771 | 12/1976 | Feneis et al. | 523/442 |
| 4,075,153 | 2/1978 | Leo | 523/415 |
| 4,417,007 | 11/1983 | Salensky et al. | 523/442 |
| 4,522,988 | 6/1985 | Das et al. | 524/493 |
| 4,639,476 | 1/1987 | Tajiri et al. | 523/466 |
| 4,748,194 | 5/1988 | Geeck | 523/427 |
| 4,753,826 | 6/1988 | Lauman | 523/466 |
| 4,847,122 | 7/1989 | Goldberg et al. | 427/410 |
| 4,891,394 | 1/1990 | Savin | 523/442 |

FOREIGN PATENT DOCUMENTS 2602239 2/1988 France .

OTHER PUBLICATIONS

"Handbook of Fillers and Reinforcements for Plastics", Katz et al., Van Nostrand Reinhold Co., New York, 1978, p. 139.

T. K. Jones, "Performance of Zinc Dust in and Epoxy Polyamide Coating" (date unknown) Matthiessen & Hegeler Zinc Co.

Premium Finishes, Inc.,"PF-300-011 Primer Specification" (4/88).

Premium Finishes, Inc., "PF-300-011 Exposy Primer Specification (Aerospace)" (5/88).

K. Lewis, Laboratory Notebook, pages dates 6/3/87, 8/27/87, 8/28/87, 8/31/87 and 9/1/87 (unpublished).

*Primary Examiner*—Joseph L. Schofer
*Assistant Examiner*—R. H. Delmendo
*Attorney, Agent, or Firm*—Frost & Jacobs

[57] ABSTRACT

A coating composition for the protection of substrates against environmental attack comprising, in weight percent based on the solvent-free weight of the composition, from about 8% to about 35% of at least one film forming polymer; from 0 to about 60% of a corrosion inhibiting agent such as metal chromates, metal phosphates, metal molybdates, particulate metallic zinc and/or particulate metallic aluminum; from 3% to about 6% of mixture of pyrogenic amorphous silicas of different particle sizes having average particle sizes ranging from about 0.007 to about 0.04 micron; from about 15% to about 55% of at least one crystalline silica having an oil absorption value of less than 20 measured by ASTM Standard Test D281-84; and 0 to 35% based on the total weight of the composition, of at least one solvent compatible with the polymer. The compositions can be prepared in organic solvent-based, water-based, or solvent-free powder forms, and have utility as primer coatings for aircraft and aerospace vehicles, and for protection of metallic substrates against corrosion.

19 Claims, No Drawings

COATING COMPOSITION EXHIBITING IMPROVED RESISTANCE TO ENVIRONMENTAL ATTACK

This is a continuation of application Ser. No. 07/319,382, filed Mar. 3, 1989, now abandoned.

FIELD OF THE INVENTION

This invention relates to a coating composition which provides improved resistance to environmental attack utilizing conventional binders, by incorporation of high levels of both crystalline and micro particle amorphous silicas. The invention achieves improved corrosion resistance, either with or without the presence of corrosion inhibiting agents or powdered metal, in organic solvent-based binder systems containing epoxy, phenoxy, urethane, vinyl chloride, acrylic, polyester, or alkyd type polymers, and in water-based or solvent-free powder form binder systems containing epoxy, urethane, polyester and vinyl chloride polymers. Although not so limited, in one embodiment the invention has particular utility as an epoxy-based primer coating composition for aircraft and aerospace vehicles which exhibits greatly improved saltspray resistance and compatibility with existing polyurethane topcoats in the aircraft industry, while at the same time meeting the increasingly stringent requirements for low volatile organic content (VOC) imposed by federal and state regulatory agencies.

In another embodiment, the invention provides a powder form coating composition containing zinc or aluminum powder, or mixtures thereof, which may be applied by spraying to a metal substrate which is heated to a temperature sufficient to melt the powdered resin binder, causing it to flow and form a film in which the remaining particulate ingredients are uniformly suspended.

In a further embodiment, the invention provides a zinc-rich or aluminum-rich liquid coating composition which may be a one component or a two component system having a VOC not greater than 25% by weight of the total composition (i.e. less than 340 grams per liter). This embodiment also includes water-based epoxy-polyamide binder compositions containing zinc and/or aluminum.

BACKGROUND OF THE INVENTION

Primer coats for aircraft are required to withstand 3000 hours saltspray resistance with a deposition of about 15 microns (about 0.6 mil), and to avoid osmotic blister formation when topcoated and subjected to 168 hours immersion in water at 150° F. (about 65° C.). This is referred to as compatibility. Osmotic blisters are caused by a rapid loss of weight as the corrosion inhibiting agents dissolve, leaving numerous voids in the primer coating which result in a collapse of the topcoat. Saltspray resistance is determined by the test set forth in Northrop Corporation Material Specification NAI-1269 Revision G.

Since conventional aircraft primers contain corrosion inhibiting pigments such as chromates of zinc, strontium, and/or barium, zinc molybdate, zinc phosphate, and the like, it has been necessary for the prior art to use an epoxy polymer of relatively high molecular weight, which is solid at room temperature, in order to cause the metal chromates to dissolve or "leach" gradually during the 168 hours water immersion test at 150° F., or the comparable test of condensing humidity for 1550 hours at 120° F. (about 50° C.). These medium to high molecular weight epoxy polymers used in the prior art require relatively high levels of VOC, well above the current permissible maximum of 340 grams per liter.

U.S. Pat. No. 3,954,693, issued May 4, 1976, to C. C. Fong, is representative of prior art coating compositions for aircraft utilizing an epoxy resin binder with a polyisocyanate hardener of specific type, pigments such as zinc, cobalt, and strontium chromates, a suspending agent which may comprise pyrogenic silica in amounts up to 4% by weight of the epoxy resin, a catalyst, an epoxy-containing silane as a coupling agent, and volatile organic solvents ranging from about 40% to about 85% by volume of the composition. In all specific examples, the total solvent content was at least 40%.

In order to attain the higher solids levels needed to meet the low VOC requirements, a relatively low molecular weight epoxy polymer is required which is liquid at room temperature. However, the lower molecular weight of liquid epoxy polymers permits rapid leaching of the corrosion inhibiting agents (chromates and the like), thereby reducing saltspray resistance and causing blistering when topcoated with polyurethane and immersed in water at 150° F. for 168 hours.

This dilemma has made it impossible for conventional coating compositions simultaneously to meet the saltspray resistance and 150° F. water immersion tests and to comply with the low VOC requirements. Consequently, the aircraft and aerospace industry has been operating under a waiver of the low VOC requirement, pending development of a primer composition which would effectively meet all requirements.

The above problems are further complicated by recent restrictions on the use of zinc and strontium chromates due to the carcinogenic nature thereof. Moreover, zinc phosphate has been found to be less effective as a corrosion inhibiting agent in comparison to zinc or strontium chromates.

U.S. Pat. No. 4,748,194, issued May 31, 1988, to T. Geeck, discloses a coating composition containing from 13 to 52 parts per hundred of a powdered metal (zinc, cadmium, stainless steel, aluminums, and alloys thereof), a linear epoxy or phenoxy resin having an average molecular weight of less than 15,000, a cross-linking blocked isocyanate, and active and inactive organic solvents. Optionally, a suspension agent and a thixotropic agent may be added. Polyethylene in amounts up to 5 parts per hundred is mentioned as a suspension agent, and silane treated silica dioxide in amounts up to 2 parts per hundred is mentioned as a thixotropic agent.

U.S. Pat. No. 3,998,771, issued Dec. 21, 1976, to T. J. Feneis, Jr. et al., discloses a water-based coating composition containing about 55% to 70% by weight zinc dust (based on the total weight of the composition), about 2% to 10% by weight of a liquid grade epoxy resin, and about 2% to 10% by weight of a polyamide-epoxy resin adduct. Color pigment in an amount up to about 0.75% may be added. This is a three-component system since the zinc is mixed with the binder at the time of use. This would preclude industrial moving line applications and the like.

French Patent Application 2,602,239, published Feb. 5, 1988, in the name of Ronald Savin (the present inventor), discloses a two phase coating composition containing up to 70% by weight of a powdered metal (based on the total weight of the composition), from about 2% to 30% by weight of a film-forming polymer, from about 2% to 30% by weight of a hardener for the polymer, from at least 1.8% to 30% of an agent for control of rheological characteristics, and up to 30% by weight organic solvents. The preferred polymer is an epoxy resin having an average molecular weight of 350 to 3800. Vinyl chloride polymers may also be used. The agent for control of rheological characteristics comprises at least one pyrogenic silica, and optionally at least one natural or transformation silica having an oil absorption value preferably not greater than 90 and more preferably not greater than 40.

It is known that the length of path which moisture must diffuse to penetrate a protective coating on a metal surface is greater for lamellar or flakelike pigment particles than a coating containing amorphous pigment particles. The platelike pigment structure provides a tight film barrier which inhibits the passage of moisture and atmospheric contaminants.

Naturally occurring metal oxides, such as micaceous iron oxide with particle sizes ranging from about 15 to 100 microns, have been applied with about 20 layers of interleaved lamellar particles (about 5 mils in thickness) to form a layered protective coating which is extremely moisture resistant. However, this prior art type of pigmentation is not suitable in protective coatings for aircraft, automotive components and electrical equipment, since such products must be coated in production lines with depositions between about 0.5 and 1.5 mils (12.5 and 37.5 microns) in thickness. In order to obtain a smooth topcoat of about 6 to 8 Hegman gauge, it is essential that the primer be milled to a fine grind. Consequently, the penetration of moisture must be inhibited by pigmentation other than a high build, rough lamellar particle interleave.

It is, therefore, evident that a genuine need exists for coatings of all conventional types (organic solvent-based, water-based and powder), which exhibit improved resistance against environmental attack and, in particular, primer coatings in the aircraft and aerospace field.

SUMMARY OF THE INVENTION

It is an object of the invention to provide coating compositions using conventional binders which exhibit improved resistance to environmental attack.

It is a further object of the invention to provide a coating composition having an epoxy, or a polyurethane/polyester binder and optional corrosion inhibiting agents for use in the aircraft industry, which exceeds the saltspray and hot water test requirements while at the same time meeting the low VOC requirements currently in effect and having a viscosity suitable for deposition by conventional equipment.

It is another object of the invention to provide a coating composition of the organic solvent-based, water-based or powder type, containing powdered metal, which can be applied to metallic substrates (primarily ferrous metals) in production lines with conventional equipment. Here again, in organic solvent-based compositions the low VOC requirements are met.

According to the invention, there is provided a coating composition for the protection of substrates against environmental attack, comprising, in weight percent based on the dry or solvent-free weight of the composition:

from about 8% to about 35% of at least one film-forming polymer;

0 to about 60% of a corrosion inhibiting agent or pigment selected from the group consisting of metal chromates, metal phosphates, metal molybdates, particulate metallic zinc, particulate metallic aluminum, and mixtures thereof;

from 3% to about 6% of a mixture of pyrogenic amorphous silicas of different particles sizes having average particle sizes ranging from about 0.007 to about 0.04 micron (about 7 to about 40 nacrons);

from about 15% to about 55% of at least one crystalline silica having an oil absorption value less than 20 measured by ASTM Standard Test D281-84; and 0 to 35%, based on the total weight of the composition, of at least one solvent compatible with the polymer.

According to the invention, there is provided a coating composition for the protection of substrates against environmental attack having particular utility as a primer for aircraft and aerospace vehicles, comprising, in weight percent based on the dry weight of the composition, from about 10% to about 35% of a film-forming polymer which is liquid at room temperature in the presence of not more than 25% by weight solvents; up to about 25% of a corrosion inhibiting agent selected from the group consisting of metal chromates, metal phosphates, metal molybdates, particulate metallic aluminum, and mixtures thereof; from 3% to about 6% of a mixture plurality of amorphous pyrogenic silicas of different particle sizes having average particle sizes ranging from about 0.007 to about 0.04 microns; from about 20% to about 50% of a crystalline silica having an oil absorption value of less than 20 measured by ASTM Standard Test D 281-84; and not greater than 25%, based on the total weight of the composition, of at least one solvent compatible with the polymer, the composition having a viscosity suitable for application of coatings by conventional equipment.

The invention further provides a two component coating composition for the protection of substrates against environmental attack having particular utility as a primer for aircraft and aerospace vehicles, the composition after admixture having a viscosity suitable for deposition of coatings by conventional equipment, comprising, in weight percent based on the dry weight of the composition after admixture, from about 10% to about 30% of a film-forming epoxy polymer, the polymer being liquid at room temperature; from about 5% to about 30% of a crosslinking agent for the epoxy polymer; up to about 20% of a corrosion inhibiting agent selected from the group consisting of metal chromates, metal phosphates, metal molybdates, particulate metallic aluminum, and mixtures thereof; from 3% to about 6% of a mixture of amorphous pyrogenic silica of different particle sizes having average particle sizes ranging from 0.007 to about 0.04 micron; from about 20% to about 50% of a crystalline silica having an oil absorption value of less than 20 measured by ASTM Standard Test D281-84; and from about 10% to about 25%, based on the total weight of the composition, of at least one organic solvent compatible with the epoxy polymer and the crosslinking agent.

A two component zinc-rich coating composition of the invention having particular utility in the protection of ferrous substrates against environmental attack comprises, in weight percent based on the dry weight of the composition after admixture, from about 8% to about 25% of a film-forming polymer selected from the group consisting of epoxy resins having an epoxide value of about 250 to 2500, vinyl chloride resins copolymerized with polyisocyanates, vinyl chloride resins copolymerized with melamines, and mixtures thereof; from about 25% to about 60% of particulate metallic zinc as a corrosion inhibiting agent; from 3% to about 6% of a mixture of pyrogenic amorphous silicas of different particle sizes having average particle sizes ranging from about 0.007 to about 0.04 micron; from about 20% to about 30% of a crystalline silica having an oil absorption value less than 20 measured by ASTM Standard Test D281-84; from 0 to about 30% of a crosslinking agent for said polymer; and not more than 25% organic solvents, based on the total weight after admixture.

The invention also provides a coating composition in powder form having utility in the protection of ferrous metal substrates against environmental attack, comprising, in weight percent based on the total weight of the composition, from about 10% to about 30% of a particulate epoxy resin having a melting point not greater than about 250° C.; from about 25% to about 55% particulate metallic zinc having a mean particle size between about 2 and about 10 microns as a corrosion inhibiting agent; from 3% to about 6% of a mixture of pyrogenic amorphous silicas of different particle sizes having average particle sizes ranging from about 0.007 to about 0.014 micron; and from about 20% to about 30% of a crystalline silica having an oil absorption value less than 20 measured by ASTM Standard Test D281-84.

DETAILED DESCRIPTION OF THE INVENTION

The present invention is based on the concept that improved resistance against environmental attack can be achieved by providing a physical or "mechanical" screen within the deposited coating which virtually inhibits the passage of water, saltspray, moisture resulting from humidity, and the like, into and through the coating and ultimately, into contact with the substrate. A screen of this type would control the leaching of corrosion inhibiting agents such as metal chromates, phosphates and molybdates. Numerous types of extender pigments having relatively high oil absorption values were tested for this purpose, including hydrophobic silica (silane treated silica), large amounts of relatively small particle size silica, talcs, diatomaceous earth, magnesium silicates, aluminum silicates, and similar materials. All such materials were unsuccessful.

It was found that the extender pigments listed above, when incorporated in quantities which should be sufficient to block the passage of moisture effectively, have oil absorption levels which render the coating short or "cheesy" and hence ineffective as a moisture barrier when deposited in films of about 0.5 to 5 mils thickness. In accordance with the present invention, it has been determined that up to 55% by weight of the dried film can comprise a crystalline silica having an oil absorption value of less than 20 without degrading the coating. Levels of about 30% to about 50% by weight of this silica in a dried organic coating (without corrosion inhibiting agents present) greatly reduce penetration of moisture into the film. This low oil absorption value is considered critical. However, when incorporating such crystalline silica into the low molecular weight epoxy or polyurethane resins needed to meet the low VOC requirements for aircraft and aerospace primers, the leaching or solubilization of corrosion inhibiting agents (such as metal chromates, metal molybdates, and metal phosphates required by government specifications) is substantially increased, with the result that osmotic blister formation occurs when topcoated and subjected to the above-described 168 hour water immersion test at 150° F. This problem is solved in the present invention by inclusion of a series of secondary microparticle pigments to block the moisture penetration not contained by the crystalline silica of low oil absorption value.

More specifically, it has been found that with the addition of 3% to about 6% by weight (based on the solvent-free weight of the composition) of mixed size grades of amorphous pyrogenic silicas having average particle sizes between about 0.007 and 0.04 micron along with crystalline silica, virtually all moisture is blocked from penetrating the film, producing a very slow leaching of corrosion inhibiting agents. Saltspray resistance over aircraft aluminum substrates reaches levels in excess of 15,000 hours with no damage to the metal substrates, and development of osmotic blisters in the topcoats is prevented substantially beyond the 168 hours required by the standard test.

These improved results are also attained in all other embodiments, both with and without the presence of corrosion inhibiting agents.

A further advantage of the mixed particle size grades of pyrogenic silicas used in the compositions of this invention is the capability of obtaining a viscosity in solvent-based and water-based embodiments suitable for application by conventional equipment. In preliminary tests wherein all the pyrogenic silica had an average particle size of 0.007-0.008 micron, it was found that incorporation of more than about 4%, based on the dry weight of the composition, of such silica resulted in a viscosity which was much too high for application by conventional equipment, when following the recommendations of the producers of pyrogenic silica for incorporation of such silica into coating compositions. Surprisingly, substitution of as little as about one-third the total weight of pyrogenic silica of a mixture of pyrogenic silicas having average particle sizes ranging from about 0.014 to about 0.04 micron resulted in reduction of viscosity to a useable value without requiring an increase in solvents content above the prescribed levels.

Pyrogenic amorphous silicas having average particle sizes ranging from 0.007 to 0.04 micron are produced from specific treatments such as high temperature hydrolysis of silicon tetrachloride or from transformation of silica in an electric arc. Suitable silicas having the required microparticle sizes include those marketed under the trademark "Aerosil" by Degussa, and "Cabosil" by Cabot Corporation. More specifically, "Aerosil 300" has an average particle size of about 0.007 micron; "Aerosil 380" also has an average particle size of about 0.007 micron; "Cabosil HS5" has an average particle size of about 0.008 micron; "Aerosil 200" has an average particle size of about 0.014 micron; "Aerosil 130" has an average particle size of about 0.018 micron; and "Aerosil 50" has an average particle size of about 0.04 micron. In all compositions of the present invention (solvent-based, water-based and powder form), preferably at least four of these grades are used in admixture. More preferably, from about one-third to about two-thirds comprise silicas having an average particle size of about 0.007 and/or about 0.008 micron, with the remainder being a mixture ranging from about 0.014 to about 0.04 micron in average particle size.

The broad range, based on the dry weight of the composition, of the mixed amorphous pyrogenic silicas is from 3% to about 6%. A preferred range is from about 3.1% to about 5%. This encompasses both epoxy and urethane binders in solvent-based, powder and aqueous forms.

A minimum of 3% by weight, based on the dry weight of the composition, of mixed particle size amorphous pyrogenic silicas having average particle sizes ranging from 0.007 to 0.04 micron, in combination with about 20% to about 55% by weight (based on the dry weight of the composition) of crystalline silica having an oil absorption value of less than 20, is thus considered to be critical in the composition of the present invention. The maximum amount of amorphous pyrogenic silica is not critical and is dictated primarily by the viscosity desired in the admixed composition. The maximum may be about 6% by weight of the dry composition for epoxy, vinyl chloride, and urethane binders.

As indicated above, the compositions of the invention require a crystalline silica having an oil absorption value or number of less than 20 measured by ASTM Standard Test D281-84 (which is set forth hereinafter). This crystalline silica is present in an amount ranging from about 15% to about 55% by weight, based on the dry weight of the composition, and preferably from about 20% to about 45%. In a two component epoxy system, the crystalline silica may be present in both components. A natural crystalline silica sold under the trademark NOVACITE by Malvern Minerals Company has been found to be suitable. It has an oil absorption value of about 17. A silane-treated crystalline silica sold under the trademark NOVAKUP by Malvern Minerals Company is also suitable, and it has an oil absorption value less than 20. The particle size of the crystalline silica is not critical and may range from about 2 to about 8 microns, with an average of about 5 microns.

In a coating composition in accordance with the invention for aerospace applications, a film-forming polymer which is liquid at room temperature, when dissolved in not more than 25% by weight solvents, is present within the range of from about 10% to about 30% by weight and preferably from about 20% to about 30%. The polymer may be an epoxy, phenoxy, urethane, vinyl chloride, acrylic, polyester, or alkyd type resin. As is known in the art, epoxy, phenoxy, urethane and vinyl chloride polymers coreacted with blocked or unblocked polyisocyanates, or melamines, may be either two component or one component systems.

Epoxy polymers useful in the invention preferably contain at least one epoxy function per molecule with the formula

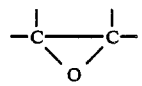

Typical epoxy polymers include the reaction product of an epihalohydrin, e.g., epichlorohydrin, and a polyol such as glycerol, a polyphenol or a bis-hydroxyphenyl alkane, e.g. bisphenol-A. The molecular weight is within a range which renders the polymer liquid at room temperature, for aerospace applications.

An epoxy resin sold under the trademark "Shell 828" by Shell Oil, Company, has been found to be a satisfactory low molecular weight epoxy polymer. The epoxide value is from 182 to 192. Other equivalent epoxy polymers are commercially available.

For embodiments of the invention in solvent-based or powder forms adapted for use as corrosion-inhibiting coatings on ferrous metal substrates (generally containing metal powder), a higher molecular weight polymer is used which is solid at room temperature. For solvent-based compositions, an epoxy resin sold under the trademark "Shell 1001" is suitable. The epoxide value is from 475 to 525. Other equivalent epoxy resins are commercially available, having epoxide values ranging from about 400 to about 600 for solvent-based compositions, and from 900 to about 2000 for powder compositions.

Vinyl chloride can be coreacted with blocked or unblocked polyisocyanates, or melamines, as is known in the art.

Suitable vinyl copolymers which are solid at room temperature are commercially available. These will be liquid at room temperature by addition of less than 25% by weight solvents.

Urethane, acrylic, polyester, or alkyd type polymers which either are liquid at room temperature, or are rendered liquid by less than 25% solvents, are also commercially available, and the manner of production thereof is known in the art. Urethane polymers are produced by reaction of a polyisocyanate with a polyol, usually in the presence of an organometal catalyst, as taught in U.S. Pat. No. 3,725,355, issued Apr. 3, 1973, to D. B. Parrish et al., the disclosure of which is incorporated by reference.

Crosslinking agents or hardeners for epoxy resins include at least one compound with an —NH$_2$, —CONH$_2$, —NHR, —CONHR, and/or —COOH functional group, which react with the epoxy function, as is well known. The preparation of epoxy resins and crosslinking reactions are described in the above-mentioned U.S. Pat. No. 3,954,693, and this disclosure is incorporated by reference. Preferably aliphatic or aromatic polyamides are used as crosslinking agents. The weight ratio of epoxy polymer to hardening agent preferably ranges from about 3:1 to about 1:1. The crosslinking agent may range from about 5% to about 30% by weight of the total composition, and preferably from about 10% to about 25%.

Suitable commercially available polyamides include those sold under the trademark Versamid and Uredur, by Schering, and equivalents.

In compositions for aerospace applications, up to about 25% of at least one particulate corrosion inhibiting agent may be present, selected from the group consisting of metal chromates, metal phosphates, metal molybdates, metal powders, and mixtures thereof. Conventional corrosion inhibiting pigments include zinc, strontium, and barium chromates, although the carcinogenic nature of zinc and strontium chromates has made their use undesirable. Metal molybdates such as zinc molybdate, are preferred corrosion inhibiting pigments. Zinc, strontium or chromium phosphates are also used conventionally as corrosion inhibiting agents as is the case with zinc and aluminum powders. Metal oxides may also be added to obtain a desired color.

Organic solvents which are compatible with epoxy polymers and hardening agents and with polyurethane and polyester include ketones such as methylethylketone, methylpropylketone, methylisobutylketone, methylamylketone, and cyclohexanone; alcohols such as butanol and isopropanol; esters such as butyl and amyl acetates; and aromatic solvents such as toluene and xylene. As indicated above, not more than 25% by weight of such volatile organic solvents are present in the composition of the invention, and preferably from about 10% to less than 25% of at least one of the above solvents is present, based on the total weight of the composition.

It is preferred that a coupling agent such as a silane and/or an organo-silicon compound having an epoxy group be present in the composition in order to improve adhesion of the coating to the substrate. Up to 2% of such a coupling agent may be present, based on the dry weight.

When using an epoxy polymer, a conventional catalyst may be added to accelerate the reaction between the polymer and the crosslinking agent. The catalyst may be an organometallic compound, an amine, and/or a polyamine, in an amount ranging from about 0.1% to about 10% by weight based on the weight of the epoxy polymer, preferably up to 5% based on the dry weight of the composition.

A preferred two component epoxy binder coating composition for aerospace applications in accordance with the invention comprises, in weight percent based on the dry weight of the composition after admixture:

from about 15% to about 30% of an epoxy polymer having at least one epoxy function per molecule, the epoxy polymer being liquid at room temperature;

from about 10% to about 20% of a polyamide crosslinking agent for the epoxy polymer;

from about 10% to about 25% of a corrosion inhibiting pigment selected from the group consisting of zinc chromate, strontium chromate, barium chromate, zinc phosphate, aluminum powder, and mixtures thereof;

from about 3% to about 6% of a mixture of amorphous pyrogenic silicas of different particle sizes having average particle sizes ranging from about 0.007 to about 0.04 micron;

from about 20% to about 45% crystalline silica having an oil absorption value of less than 20 measured by ASTM standard test D281-84;

up to 2% of a coupling agent selected from the group consisting of a silane, an organo-silicon compound having an epoxy function, and mixtures thereof;

up to 5% of a catalyst selected from the group consisting of an organometallic compound, an amine, a polyamine, and mixtures thereof; and from about 10% to less than 25%, based on the total weight of the composition, of volatile organic solvents selected from the group consisting of methylethylketone, methylpropylketone, methylisobutylketone, methylamylketone, cyclohexanone, butanol, isopropanol, toluene, xylene, and mixtures thereof.

A two component urethane binder coating composition for aerospace applications in accordance with the invention comprises, in weight percent based on the dry weight of the composition after admixture:

from about 10% to about 30% of a film-forming polyol-containing polyester;

from about 7% to about 25% of an isocyanate polymer as a crosslinking agent, the polyester and the isocyanate polymer being liquid at room temperature in the presence of not more than 25% by weight solvents;

up to about 25% of a corrosion inhibiting agent selected from the group consisting of metal chromates, metal phosphates, metal molybdates, aluminum powder, and mixtures thereof;

from 3% to about 6% of a mixture of amorphous pyrogenic silicas of different particle sizes having average particles sizes ranging from about 0.007 to about 0.04 micron;

from about 20% to about 50% of a crystalline silica having an oil absorption value less than 20 measured by ASTM standard test D281-84; and not greater than 25%, based on the total weight of the composition, of at least one organic solvent compatible with the polyester and the isocyanate polymer.

A preferred one component zinc-rich composition adapted for rollercoat application to coil steel and flowcoat application to steel reinforcing bars (which are uses where the low VOC requirements are waived) comprises, in weight percent based on dry weight:

from about 10% to about 25% of a solid linear epoxy resin;

from about 30% to about 60% particulate metallic zinc;

from about 20% to about 40% crystalline silica having an oil absorption value less than 20 measured by ASTM Standard Test D281-84;

from 3% to about 5% of a mixture of amorphous pyrogenic silicas different particle sizes having average particle sizes ranging from about 0.007 to about 0.04 micron;

up to about 1% of a suspension agent; and from about 10% to about 35%, based on the total weight of the composition, of organic solvents selected from the group consisting of methylethylketone, methylpropylketone, methylisobutylketone, methylamylketone, butanol, isopropanol, butyl acetate, amyl acetate, and mixtures thereof.

A preferred two component zinc-rich composition adapted for application to metallic substrates comprises, in weight percent based on dry weight after admixture:

from about 8% to about 25% of a solid epoxy resin having an epoxide value of about 400 to about 600;

from about 30% to about 60% particulate metallic zinc;

from about 20% to about 30% crystalline silica having an oil absorption value less than 20 measured by ASTM Standard Test D281-84;

from 3% to about 5% of a mixture of pyrogenic amorphous silicas of different particle sizes having average particle sizes ranging from about 0.007 to about 0.04 micron;

from about 7% to about 25% of a polyamide or polyamine crosslinking agent for said epoxy resin;

up to about 1% anti-foaming and wetting agents;

up to about 1% suspension agent; and from about 10% to about 25%, based on the total weight of the composition, of organic solvents selected from the group consisting of ketones, alcohols, esters, aromatic compounds, and mixtures thereof.

A preferred zinc-rich composition in powder form adapted for application to ferrous metal substrates comprises, in weight percent:

from about 10% to about 25% of at least one particulate epoxy resin having epoxide values ranging from about 800 to about 2200;

up to about 5% of a flow control resin concentrate;

up to about 6% of a thixotropic resin concentrate;

from about 30% to about 55% particulate metallic zinc having a mean particle size ranging from about 3 to about 6 microns;

from about 20% to about 30% crystalline silica having an oil absorption value less than 20 measured by ASTM Standard Test D281-84;

from 3% to about 5% of a mixture of amorphous pyrogenic silicas of different particle sizes having average particle sizes ranging from about 0.007 to about 0.04 micron; and up to about 2% of a catalytic type curing agent for said epoxy resin.

A two component water-based zinc-rich coating composition adapted for application to ferrous metal substrates comprises, in weight percent based on the dry weight after admixture:

from about 10% to about 30% of an epoxy polymer which is liquid at room temperature, preferably having an epoxide value ranging from about 182 to 192;

from about 30% to about 60% particulate metallic zinc;

from about 20% to about 30% crystalline silica having an oil absorption value less than 20 measured by ASTM Standard Test D281-84;

from 3% to about 5% of a mixture of pyrogenic amorphous silicas of different particle sizes having average particle sizes ranging from about 0.007 to about 0.04 micron;

from about 5% to about 20% of a water soluble polyamide crosslinking agent for the epoxy polymer, preferably having an amine value ranging from about 125 to about 160; and, based on the total weight of the composition:

from about 5% to about 15% of a water soluble glycol ether;

up to about 5% of a water soluble alkyl ether; and from about 10% to about 25% water.

Any one or more of the preferred or more preferred ranges indicated above can be used with any one or more of the broad ranges for the remaining components set forth above.

The ASTM D281-84 standard test method for oil absorption of pigments by spatula rub-out is as follows:

1 g (or any multiple thereof) of thoroughly mixed and air dried pigment is placed on a smooth glass plate or marble slab. Raw linseed oil (conforming to specification D234 except having an acid number of 3±1) is added gradually, drop by drop (by means of a dropping bottle fitted with ground-in pipet and rubber bulb, or buret graduated in 0.1 ml divisions) to the pigment. After the addition of each drop, the oil is thoroughly incorporated by rubbing up with a sharp-edged steel spatula. The end point is reached when exactly enough oil has been incorporated with the pigment to produce a very stiff, putty-like paste which does not break or separate. Oil absorption value is reported as the number of pounds (grams) of oil required to wet exactly 100 pounds (grams) of pigment.

Coatings of the present composition in liquid form may be applied by conventional equipment, including airless and electrostatic spray, dip, flowcoat, and roller coating, to obtain dried coating layers having a thickness ranging between about 10 and about 150 microns without the appearance of runs. All compositions are recoatable within 30 minutes after application and indefinitely thereafter without subsequent loss of adhesion. The flexibility of coatings is sufficient to permit later forming of the substrate into parts for various manufacturing operations. Adhesion to aluminum and ferrous metal substrates is excellent.

Coatings in accordance with the invention in powder form may be applied by spraying to a preheated or postheated metallic substrate. More specifically, the powder may be applied by electrostatic spraying to iron or steel substrates, fabricated as sheets, rods or tubes, which are heated prior to or after spraying to a temperature of about 450° F. (about 232° C.), which is sufficient to melt the particulate epoxy resin, causing it to form a molten film in which the remaining constituents are uniformly dispersed. A catalytic agent is preferably provided in the composition, in amounts up to about 2% by weight, which completes crosslinking of the resin rapidly; and the coated substrate is then quenched or cooled rapidly if preheated. Mixed grades of pulverized epoxy resins having epoxide values ranging from about 900 to 2000 are suitable for this embodiment. Preferably a flow control resin concentrate and a thixotropic resin concentrate are included in the composition, in amounts up to about 5% and about 6%, respectively, based on the total weight of the composition. Coatings of about 25 to about 100 microns in thickness can be applied in this manner.

The following specific examples are given to illustrate various embodiments of the coating compositions of the present invention. They are not to be construed as limitations on the invention herein claimed.

EXAMPLE 1

A two component epoxy binder coating composition for use as an aircraft or aerospace primer was prepared by separately mixing the components set forth under Phase A and Phase B, respectively, the amounts being expressed in parts by weight, and percent based on dry weight after admixture.

| | Parts by weight | % based on dry weight |
|---|---|---|
| PHASE A | | |
| Liquid epoxy resin - trademark "Shell 828" (epoxide value 182-190) | 325 | 17.4 |
| Zinc phosphate | 300 | 16.1 |
| Crystalline silica - trademark "NOVACITE" 1250 (oil absorption value about 17) | 250 | 13.4 |
| Talc - MP-1250 | 50 | 2.7 |
| Anti-foaming agent - trademark "BYK 300" a polysiloxane copolymer | 3 | 0.2 |
| Solvent - methylisobutylketone | 145 | not applicable (N.A.) |
| Solvent - methylethylketone | 145 | N.A. |
| PHASE B | | |
| Polyamide hardener - Sylvamid 300 | 326 | 17.5 |
| Color pigment - titanium dioxide | 50 | 2.7 |
| Talc - MP-1250 | 175 | 9.4 |
| Crystalline silica (silane treated trademark "NOVAKUP 1250" from Malvern Minerals | 150 | 8.0 |
| Crystalline silica - trademark "NOVACITE 1250" from Malvern Minerals | 175 | 9.4 |
| Pyrogenic amorphous silicas: | | |
| trademark "Aerosil 380" from Dugussa (0.007 micron) | 36 | 1.92 |
| trademark "Aerosil 200" from Dugussa (0.014 micron) | 6 | 0.32 |
| trademark "Aerosil 130" from Dugussa (0.018 micron) | 6 | 0.32 |
| trademark "Aerosil 50" from Dugussa (0.04 micron) | 12 | 0.64 |
| Solvent - xylenol | 192 | N.A. |
| Solvent - butanol | 48 | N.A. |

Each phase was prepared by mixing with slow agitation in a pebble mill. The two phases were admixed in approximately 1:1 proportions by volume. The admixture had a viscosity of about 25 seconds in a Zahn No. 2 cup.

Aircraft aluminum panels were sprayed with the admixture to provide a dried coating of less than 1 mil thickness. The coating was dry to the touch in 15 minutes. Half the panels were subjected to the standard saltspray resistance test and withstood 7500 hours, at which time the test was terminated. The remaining coated panels were topcoated with a conventional polyurethane finish and subjected to the standard immersion test in water at 150° F. These panels passed 168 hours without formation of osmotic blisters. Adhesion and flexibility of the epoxy primer coating were excellent.

EXAMPLE 2

A two component urethane binder coating composition for use as an aircraft or aerospace primer was prepared by separately mixing the components set forth under Phase A and Phase B, respectively, the amounts being expressed in parts by weight, and percent based on dry weight after admixture.

|  | Parts by weight | % based on dry weight |
| --- | --- | --- |
| PHASE A | | |
| Polyester - trademark "XP631" from Mobay Chemicals | 140 | 14.7 |
| Reactive diluent trademark "QM1007" from Rohm & Haas | 54 | 5.7 |
| Strontium chromate - J-1365 | 200 | 21.0 |
| Crystalline silica (silane treated) trademark "NOVAKUP 1250" | 330 | 34.7 |
| Pyrogenic amorphous silicas: | | |
| trademark "Cabosil HS5" from Cabot Corp. (0.008 micron) | 18 | 1.89 |
| trademark "Aerosil 200" (0.014 micron) | 3 | 0.32 |
| trademark "Aerosil 130" (0.018 micron) | 3 | 0.32 |
| trademark "Aerosil 50" (0.04 micron) | 6 | 0.64 |
| Solvent - Exxate 600 | 80 | N.A. |
| Solvent - n-butyl acetate | 80 | N.A. |
| Solvent - methylethylketone | 54 | N.A. |
| Catalyst - trademark "DABCO T-12" 10% solution (dibutyltin dilaurate) | 0.5 | 0.053 |
| Pot life extender - 2-4 pentanedione | 0.75 | 0.078 |
| PHASE B | | |
| Urethane - isocyanate - trademark "Mobay N-3200" | 195 | 20.5 |
| Solvent - methylpropylketone | 34 | N.A. |

Each phase was prepared as in Example 1, and the two phases were admixed in approximately 3 parts by volume of Phase A to 1 part by volume of Phase B.

The admixture had a viscosity suitable for application by spraying. This urethane binder composition could be used without chromate pigments either as a primer coat or a finish coat. Its properties were tested and found to exceed all existing requirements for aircraft application.

EXAMPLE 3

A one component zinc-rich primer for application to ferrous metal substrates by rollercoating, flowcoating, and the like, was prepared by mixing the components with slow agitation in a pebble mill. The amounts are expressed in parts by weight and percent based on dry weight.

|  | Parts by weight | % based on dry weight |
| --- | --- | --- |
| Linear epoxy - trademark "Ciba 488-40" from Ciba-Geigy, molecular weight about 15,000 (40% solids in methylethylketone) | 475 | 14.6 |
| Zinc dust - N.J. Zinc 64 (6 microns mean particle size) | 750 | 57.8 |
| Crystalline silica - trademark "NOVACITE 1250" | 300 | 23.1 |
| Suspension agent - trademark "Bentone 38" - hydrated aluminum silicate | 8 | 0.62 |
| Pyrogenic amorphous silicas: | | |
| trademark "Cabosil HS5" (0.008 micron) | 20 | 1.55 |
| trademark "Aerosil 380" (0.007 micron) | 7.5 | 0.58 |
| trademark "Aerosil 200" (0.014 micron) | 7.5 | 0.58 |
| trademark "Aerosil 130" (0.018 micron) | 7.5 | 0.58 |
| trademark "Aerosil 50" (0.04 micron) | 7.5 | 0.58 |
| Solvent - methylethylketone | 70 | N.A. |
| Solvent - amyl acetate | 210 | N.A. |

The composition had a viscosity suitable for application by conventional equipment when reduced 25% by volume with an appropriate solvent blend. For rollercoat application to coil steel and flowcoat application to reinforcing bars, the low VOC requirements are waived, as indicated above. Deposited dried coatings having a thickness between about 2.5 and 5 mils (62.5 and 125 microns) on degreased steel substrates exhibited the following properties:

| Saltspray test | |
| --- | --- |
| (Northrop NA1-1269 Rev. G) | >2500 hours |
| Adhesion (24 hr. H₂O) | excellent |
| Impact front | >160 in lb |
| Flexibility (23° C. 50% R.H.) | excellent |

EXAMPLE 4

A two component zinc-rich composition for application to ferrous metal substrates by conventional equipment was prepared by separately mixing the components set forth under Phase A and Phase B, respectively, in the manner described in Example 1, the amounts being expressed in parts by weight, and percent based on dry weight after admixture.

|  | Parts by weight | % based on dry weight |
| --- | --- | --- |
| PHASE A | | |
| Solid epoxy resin - trademark "Shell 1001" (epoxide value 475-525) | 175 | 9.2 |
| Anti-foaming agent - trademark "BYK-052" - proprietary silicone-free formulation 19%-21% solids | 4 | 0.2 |
| Wetting and flow control agent - trademark "Beetle 216-8" - urea formaldehyde | 8 | 0.4 |
| Zinc dust - N.J. Zinc 64 | 1100 | 57.9 |
| Crystalline silica - trademark "NOVACITE 1250" | 400 | 21.0 |
| Anti-settling and suspension agent - trademark "Bentone 38" | 5 | 0.3 |
| Pyrogenic amorphous silicas: | | |
| trademark "Cabosil HS5" (0.008 micron) | 30 | 1.6 |
| trademark "Aerosil 200" (0.014 micron) | 10 | 0.5 |
| trademark "Aerosil 130" (0.018 micron) | 10 | 0.5 |
| trademark "Aerosil 50" (0.04 micron) | 10 | 0.5 |
| Solvent - methylisobutylketone | 140 | N.A. |
| Solvent - methylamylketone | 70 | N.A. |
| Solvent - xylenol | 70 | N.A. |
| PHASE B | | |
| Polyamide hardener - amine value 55 (60% solids in isopropanol and toluene) | 250 | 7.9 |
| Solvent - butanol | 75 | N.A. |
| Solvent - 100 aromatic | 25 | N.A. |

| | Parts by weight | % based on dry weight |
|---|---|---|
| Solvent - 150 aromatic | 25 | N.A. |

This composition exhibited improved pot life after admixture in a 2:1 proportion by volume of Phase A to Phase B, and exhibited other properties comparable to those of Example 3.

EXAMPLE 5

An epoxy binder, solvent-free zinc-rich composition in powder form, having particular utility for application by electrostatic spraying to preheated ferrous articles such as steel reinforcing bars, is prepared by mixing the particulate components in a pebble mill. The amounts are expressed in parts by weight and percent by weight.

| | Parts by weight | % by weight |
|---|---|---|
| Powdered epoxy - mixed grades epoxide values of 900-2000 trademark "Epotuf 37-834" from Reichold Chemicals | 350 | 16.6 |
| Flow control resin concentrate trademark "Epotuf 37-846" from Reichold Chemicals | 95 | 4.5 |
| Thixotropic resin concentrate trademark "Epotuf 37-847" from Reichold Chemicals | 110 | 5.2 |
| Curing agent (catalyst) trademark "Epotuf 37-840" from Reichold Chemicals (proprietary comp.) | 33 | 1.6 |
| Crystalline silica - trademark "NOVACITE 1250" | 450 | 21.3 |
| Zinc dust - N.J. Zinc 84 (4 microns mean particle size) | 1000 | 47.5 |
| Pyrogenic amorphous silicas: | | |
| trademark "Aerosil 300" (0.007 micron) | 30 | 1.4 |
| trademark "Aerosil 200" (0.014 micron) | 10 | 0.5 |
| trademark "Aerosil 130" (0.018 micron) | 10 | 0.5 |
| trademark "Aerosil 50" (0.04 micron) | 20 | 0.9 |

Coatings of about 2.5 to 5 mils (62.5 to 125 microns) thickness are applied to steel substrates preheated or postheated to about 230° C., at which temperature the resin components melt and flow to form a continuous film in which the other components are uniformly dispersed. The coated substrates are then quenched if preheated, and the resulting coating provides excellent corrosion resistance, together with good flexibility and impact resistance.

EXAMPLE 6

A two component water-based zinc-rich composition having utility for ferrous metal substrates was prepared by separately mixing the components set forth under Phase A and Phase B, respectively, with the amounts being expressed in parts by weight, and percent based on dry weight after admixture.

| | Parts by weight | % based on dry weight |
|---|---|---|
| PHASE A | | |
| Liquid epoxy resin - trademark "Shell 828" (epoxide value 182-190) | 250 | 13.1 |
| Glycol ether - DPM (medium boiling) | 256 | N.A. |
| Zinc dust - N.J. Zinc (5 microns mean particle size) | 1050 | 54.8 |
| Crystalline silica - trademark "NOVACITE" (oil absorption value <20) | 425 | 22.2 |
| Pyrogenic amorphous silicas: | | |
| trademark "Cabosil HS5" (0.008 micron) | 10 | 0.5 |
| trademark "Aerosil 300" (0.007 micron) | 10 | 0.5 |
| trademark "Aerosil 130" (0.014 micron) | 15 | 0.8 |
| trademark "Aerosil 50" (0.04 micron) | 25 | 1.3 |
| PHASE B | | |
| Water-borne amide - trademark "Casamid 360W" (50% solids - amine value 130-160) | 250 | 6.5 |
| Dipropylene methyl ethyl ether - BPM | 40 | N.A. |
| Water | 542 | N.A. |
| Anti-foaming agent - trademark "BYK 031" - proprietary formulation | 5 | 0.3 |

The two phases were admixed in approximately 1:1 proportions by volume. The resulting admixture had a viscosity suitable for application by conventional equipment. Deposited coatings dried within 25 minutes, and test panels exhibited properties comparable to those of Examples 3 and 4.

What is claimed is:

1. A coating composition for the protection of substrates against environmental attack, comprising, in weight percent based on the dry weight of the composition:

from about 8% to about 35% of a film-forming epoxy polymer;

0 to about 60% of a corrosion inhibiting agent selected from the group consisting of metal chromates, metal phosphates, metal molybdates, particulate metallic zinc, particulate metallic aluminum, and mixtures thereof;

from 3% to about 6% of a mixture of pyrogenic amorphous silicas comprising from four particle size grades, with at least about one-third to about two-thirds by weight of said silicas having an average particle size of about 0.007 to about 0.008 micron and the remainder being a mixture having average particle sizes ranging from about 0.014 to about 0.04 micron;

from about 15% to about 55% of a least one crystalline silica having an oil absorption value of less than 20 measured by ASTM Standard Test D 281-82; and 0 to 35%, based on the total weight of the composition, of at least one solvent compatible with said film-forming epoxy polymer.

2. The composition of claim 1, wherein said film-forming epoxy polymer is an epoxy resin having an epoxide value of about 250 to 2500, and including from about 5% to about 30% of a crosslinking agent for said epoxy resin.

3. The composition of claim 2, wherein said solvent is selected from the group consisting of ketones, alcohols, esters, aromatic organic compounds, and mixtures thereof, in an amount less than 340 grams per liter of said composition.

4. A coating composition for the protection of substrates against environmental attack, comprising, in weight percent based on the dry weight of the composition:

from about 10% to about 35% of a film-forming epoxy polymer which is liquid at room temperature in the presence of not more than 25% by weight solvents;

up to about 25% of a corrosion inhibiting agent selected from the group consisting of metal chromates, metal phosphates, metal molybdates, particulate metallic aluminum, and mixtures thereof;

from 3% to about 6% of a mixture of amorphous pyrogenic silicas comprising from four particle size grades, with at least about one-third to about two-thirds by weight of said silicas having an average particle size of about 0.007 to about 0.008 micron and the remainder being a mixture having average particle sizes ranging from about 0.014 to about 0.04 micron;

from about 20% to about 50% of a crystalline silica having an oil absorption value less than 20 measured by ASTM Standard Test D 281-84; and not greater than b 25%, based on the total weight of the composition, of at least one solvent compatible with said film-forming epoxy polymer, said composition having a viscosity suitable for application of coatings by conventional equipment.

5. The composition of claim 4, wherein said corrosion inhibiting agent includes a chromate of at least one of zinc, strontium and barium, and zinc phosphate, in a total amount ranging from about 10% to about 20% by weight.

6. The composition of claim 4, wherein said film-forming epoxy polymer is a liquid epoxy resin, and including from about 5% to about 30% by weight of a crosslinking agent for said epoxy resin.

7. The composition of claim 6, wherein said solvent is selected from the group consisting of ketones, alcohols, esters, aromatic organic compounds, and mixtures thereof, in an amount less than 340 grams per liter of said composition.

8. A two component coating composition as claimed in claim 4, said composition after admixture having a viscosity suitable for deposition of coating by conventional equipment, comprising, in weight percent based on the dry weight of the composition after admixture:

from about 10% to about 30% of film-forming epoxy polymer, said polymer being liquid at room temperature;

from about 5% to about 30% of a crosslinking agent for said epoxy polymer;

up to about 20% of a corrosion inhibiting agent selected from the group consisting of metal chromates, metal phosphates, metal molybdates, particulate metallic aluminum, and mixtures thereof;

from 3% to about 6% of a mixture of amorphous pyrogenic silicas comprising from four particle size grades, with at least about one-third to about two-thirds by weight of said silicas having an average particle size of about 0.007 to about 0.008 micron and the remainder being a mixture having average particle sizes ranging from about 0.014 to about 0.004 micron;

from about 20% to about 50% of a crystalline silica having an oil absorption value of less than 20 measured by ASTM Standard Test D 281-84; and from about 10% to about 25%, based on the total weight of the composition, of at least one organic solvent compatible with said epoxy polymer and said crosslinking agent.

9. The composition of claim 8, including up to 2% by weight of a coupling agent selected from the group consisting of silanes, organo-silicon compounds having an epoxy group, and mixtures thereof.

10. The composition of claim 8, including from about 0.1% to about 10% by weight, based on the weight of said epoxy polymer, of a catalyst to accelerate the reaction between said epoxy polymer and said crosslinking agent.

11. The composition of claim 8, wherein said at least one solvent is selected from the group consisting of ketones, alcohols, esters, aromatic organic compounds, and mixtures thereof, in a total amount less than 340 grams per liter of said composition after admixture.

12. The composition of claim 8, wherein said crosslinking agent is a hardener selected from the group consisting of aliphatic polyamides, aromatic polyamides, aliphatic polyamines, aromatic polyamines, and mixtures thereof.

13. A two component zinc-rich coating composition for the protection of metallic substrates against environmental attack comprising, in weight percent based on the dry weight of the composition after admixture:

from 8% to about 25% of a film-forming epoxy polymer;

from about 25% to about 60% particulate metallic zinc as a corrosion inhibiting agent;

from 3% to about 6% of a mixture of pyrogenic amorphous silicas comprising from four particle size grades, with at least about one-third to about two-thirds by weight of said silicas having an average particle size of about 0.007 to about 0.008 micron and the remainder being a mixture having average particle sizes ranging from about 0.014 to about 0.04 micron;

from about 20% to about 30% of a crystalline silica having an oil absorption value of less than 20 measured by ASTM Standard Test D 281-84;

from 0 to about 30% of a crosslinking agent for said polymer; and not more than 25% organic solvents, based on the total weight of the composition after admixture.

14. The composition of claim 13, comprising, in weight percent based on dry weight after admixture:

from about 8% to about 25% of a solid epoxy resin having an epoxide value of about 400 to about 600;

from about 30% to about 60% particulate metallic zinc;

from about 3% to about 5% of a mixture of pyrogenic amorphous silicas comprising from four particle size grades, with at least about one-third to about two-thirds by weight of said silicas having an average particle size of about 0.007 to about 0.008 micron and the remainder being a mixture having average particle sizes ranging from about 0.014 to about 0.04 micron;

from about 20% to about 30% of a crystalline silica having an oil absorption value of less than 20 measured by ASTM Standard Test D 281-84;

from about 7% to about 25% of a polyamide or polyamine crosslinking agent for said epoxy resin;

up to about 1% anti-foaming and wetting agents;

up to about 1% suspension agent; and from about 10% to about 25%, based on the total weight of the composition, or organic solvents selected from the group consisting of ketones, alcohols, esters, aromatic compounds, and mixtures thereof.

15. A one component zinc-rich coating composition for the protection of metallic substrates against environmental attack, comprising, in weight percent based on the dry weight of the composition:

from about 10% to about 25% of a solid linear epoxy resin;

from about 30% to about 60% particulate metallic zinc;

from 3% to about 5% of a mixture of pyrogenic amorphous silicas comprising from four particle size grades, with at least about one-third to about two-thirds by weight of said silicas having an average particle size of about 0.007 to about 0.008 micron and the remainder being a mixture having average particle sizes ranging from about 0.014 to about 0.04 micron;

from about 20% to about 40% of a crystalline silica having an oil absorption value less than 20 measured by ASTM Standard Test D 281-84;

up to about 1% of a suspension agent; and from about 10% to about 35%, based on the total weight of the composition, of organic solvents selected from the group consisting of methylethylketone, methylpropylketone, methylisobutylketone, methylamylketone, butanol, isopropanol, butyl acetate, amyl acetate, and mixtures thereof.

16. A zinc-rich coating composition in powder form for the protection of ferrous metal substrates against environmental attack, comprising, in weight percent based on the total weight of the composition:

from about 10% to about 30% of a particulate epoxy resin having a melting point not greater than about 250° C.;

from about 25% to about 55% particulate metallic zinc having a mean particle size between about 2 and about 10 microns as a corrosion inhibiting agent;

from about 3% to about 6% of a mixture of pyrogenic amorphous silicas comprising from four particle size grades, with at least about one-third to about two-thirds by weight of said silicas having an average particle size of about 0.007 to about 0.008 micron and the remainder being a mixture having average particle sizes ranging from about 0.014 to about 0.04 micron; and from about 20% to about 30% of a crystalline silica having an oil absorption value less than 20 measured by ASTM Standard Test D 281-84.

17. The composition of claim 16, comprising, in weight percent based on the total weight of the composition:

from about 10% to about 25% of at least one particulate epoxy resin having epoxide values ranging from about 800 to about 2200;

up to about 5% of a flow control resin concentrate;

up to bout 6% of a thixotropic resin concentrate;

from about 30% to about 55% particulate metallic zinc having a mean particle size between about 3 and about 6 microns;

from 3% to about 5% of a mixture of pyrogenic amorphous silicas comprising from four particle size grades, with at least about one-third to about two-thirds by weight of said silicas having an average particle size of about 0.007 to about 0.008 micron and the remainder being a mixture having average particle sizes ranging from about 0.014 to about 0.04 micron;

from about 20% to about 30% of a crystalline silica having an oil absorption value less than 20 measured by ASTM Standard Test D 281-84; and up to about 2% of a catalytic type curing agent for said epoxy resin.

18. A two component water-based zinc-rich coating composition for the protection of metallic substrates against environmental attack comprising, in weight percent based on the dry weight of the composition after admixture:

from about 10% to about 30% of an epoxy polymer which is liquid at room temperature;

from about 30% to about 60% particulate metallic zinc;

from about 20% to about 30% crystalline silica having an oil absorption value less than 20 measured by ASTM Standard Test D 281-84;

from 3% to about 5% of a mixture of pyrogenic amorphous silicas comprising from four particle size grades, with at least about one-third to about two-thirds by weight of said silicas having an average particle size of about 0.007 to about 0.008 micron and the remainder being a mixture having average particle sizes ranging from about 0.014 to about 0.04 micron;

from about 5% to about 20% of a water soluble polyamide crosslinking agent for said epoxy polymer; and, based on the total weight of the composition;

from about 5% to about 15% of a water soluble glycol ether;

up to about 5% of a water soluble alkyl ether; and from about 10% to about 25% water.

19. The composition of claim 1, 4, 13, 15, 16, or 18, wherein said crystalline silica has a particle size ranging from about 2 to about 8 microns.

* * * * *

UNITED STATES PATENT AND TRADEMARK OFFICE
CERTIFICATE OF CORRECTION

PATENT NO. : 5,098,938
DATED : March 24, 1992
INVENTOR(S) : Ronald R. Savin

It is certified that error appears in the above—identified patent and that said Letters Patent is hereby corrected as shown below:

Column 16 - Claim 1 - Line 36 - "from" should be deleted and replaced with --at least--.

Column 16 - Claim 1 - Line 43 - "a" should be deleted and replaced with --at--.

Column 16 - Claim 1 - Line 46 - "281-82" should be deleted and replaced with --281-84--.

Column 17 - Claim 4 - Line 6 - "from" should be deleted and replaced with --at least--.

Column 17 - Claim 4 - Line 16 - "b" should be deleted.

Column 17 - Claim 8 - Line 50 - "from" should be deleted and replaced with --at least--.

Column 18 - Claim 13 - Line 24 - "from" should be deleted and replaced with --at least--.

Column 18 - Claim 14 - Line 45 - "from" should be deleted and replaced with --at least--.

Column 18 - Claim 14 - Line 60 - "or" should be deleted and replaced with --of--.

Column 19 - Claim 15 - Line 6 - "from" should be deleted and replaced with --at least--.

UNITED STATES PATENT AND TRADEMARK OFFICE
CERTIFICATE OF CORRECTION

PATENT NO. : 5,098,938
DATED : March 24, 1992
INVENTOR(S) : Ronald R. Savin

It is certified that error appears in the above-identified patent and that said Letters Patent is hereby corrected as shown below:

Column 19, Claim 16, Line 39, "from" should be deleted and replaced with --at least--.

Column 20, Claim 17, Line 10, "from" should be deleted and replaced with --at least--.

Column 20, Claim 18, Line 35, "from" should be deleted and replaced with --at least--.

Signed and Sealed this

First Day of February, 1994

*Attest:*

BRUCE LEHMAN

*Attesting Officer*  Commissioner of Patents and Trademarks